(12) United States Patent
Piket et al.

(10) Patent No.: US 8,467,521 B2
(45) Date of Patent: *Jun. 18, 2013

(54) ECHO CANCELER CIRCUIT AND METHOD

(75) Inventors: James B. Piket, Gilbert, AZ (US); Kyle K. Iwai, Chandler, AZ (US); Daniel S. Rokusek, Long Grove, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 447 days.

This patent is subject to a terminal disclaimer.

(21) Appl. No.: 12/699,947

(22) Filed: Feb. 4, 2010

(65) Prior Publication Data

US 2010/0197232 A1    Aug. 5, 2010

Related U.S. Application Data

(63) Continuation of application No. 10/735,270, filed on Dec. 12, 2003, now Pat. No. 7,680,265.

(51) Int. Cl.
H04M 9/08 (2006.01)
(52) U.S. Cl.
USPC .................................................... 379/406.08
(58) Field of Classification Search
USPC ........................................ 379/406.05, 406.08
See application file for complete search history.

(56) References Cited

U.S. PATENT DOCUMENTS

| | | | |
|---|---|---|---|
| 5,099,472 A | 3/1992 | Townsend et al. | |
| 5,268,834 A | 12/1993 | Sanner et al. | |
| 5,353,348 A | 10/1994 | Sendyk et al. | |
| 5,365,583 A | 11/1994 | Huang et al. | |
| 5,563,944 A | 10/1996 | Hasegawa | |
| 5,646,991 A | 7/1997 | Sih | |
| 5,668,871 A | 9/1997 | Urbanski | |
| 5,687,229 A * | 11/1997 | Sih ........................... | 379/406.09 |
| 6,122,506 A | 9/2000 | Lau et al. | |
| 6,195,430 B1 | 2/2001 | Eriksson et al. | |
| 6,282,176 B1 | 8/2001 | Hemkumar | |
| 6,420,975 B1 | 7/2002 | DeLine et al. | |
| 6,532,454 B1 | 3/2003 | Werbos | |
| 6,873,704 B1 | 3/2005 | Park | |
| 6,891,954 B2 * | 5/2005 | Takahashi et al. ........... | 381/71.4 |
| 7,046,794 B2 | 5/2006 | Piket et al. | |
| 7,099,458 B2 | 8/2006 | Piket et al. | |

* cited by examiner

*Primary Examiner* — Alexander Jamal

(57) ABSTRACT

Received data is filtered to produce pre-noise suppression data. Noise is removed from the pre-noise suppression data to provide noise-suppressed data. At least one weighted filter coefficient is dynamically determined using at least the pre-noise suppression data and not the noise suppressed data. The determination occurs independently from and is not affected by removing the noise from the pre-noise suppression data. Removing the noise from the pre-noise suppression data occurs independently from and is not affected by dynamically determining the at least one weighted coefficient.

25 Claims, 6 Drawing Sheets

ECHO CANCELER CIRCUIT AND METHOD

CROSS REFERENCES TO RELATED APPLICATIONS

This application is a continuation of prior U.S. patent application Ser. No. 10/735,270 filed Dec. 12, 2003 now U.S Pat. No. 7,680,265 entitled "Echo Canceler Circuit and Method," naming James Piket, Kyle Iwai, and Daniel Rokusek as inventors, the content of which is hereby incorporated herein by reference in its entirety.

FIELD OF THE INVENTION

The invention relates generally to communication systems and more particularly to echo cancelers and echo cancellation methods.

BACKGROUND OF THE INVENTION

Communications systems may employ echo cancelers to compensate for the effects of echo. These systems may also employ noise suppressors to compensate for the effects of noise in a communication environment.

Echo in a communication system is commonly characterized as the return of a part of the transmitted uplink signal from an end user back to the originator of the transmitted signal after a delay period. The reflection of the transmitted signal may occur due to a number of reasons, such as an impedance mismatch in a four/two wire hybrid, or feedback from acoustic coupling in a telephone, wireless device or hands free speaker phone at the far end. An echo signal corresponding to the delayed transmitted uplink signal is perceived as annoying to the near end user and in some cases can result in an unstable condition known as "howling".

Echo cancelers may be employed in wireless devices including a hands free speaker phone, such as cellular phones, car phones, two-way radios, car kits for cellular telephones and other suitable devices that can move throughout a geographic area. Additionally, echo cancelers may be employed in wireline devices such as hands free speaker phones, video and audio conference phones and telephones otherwise commonly referred to in the telecommunications industry as plain old telephone system (POTS) devices. Hands free speaker phones typically include a microphone to produce the uplink signal, a speaker to acoustically produce the downlink signal, the echo canceler to cancel the echo signal and a telephone circuit.

Hands free speaker phones may be integrated into an in-vehicle audio system. The vehicle may be an automobile, a boat, an airplane, or any suitable vehicle. The in-vehicle audio system may include an amplifier, speakers and an audio source, such as a tuner module, CD/DVD player, tape player, satellite radio, etc. The in-vehicle audio system may be integrated with a communication apparatus, such as a telematics communication module. For example, the telematics communication module may be a component of a General Motors' OnStar system. The telematics communication module typically collects and disseminates data, such as location information and audio, such as speech.

Echo cancelers are known to attempt to cancel the echo signals produced at the near end when the far end is transmitting by generating echo estimation data corresponding to a portion of an amplified downlink audio signal traveling through the acoustic coupling channel. The echo canceler generates the echo estimation data through the use of an echo canceler adaptive filter. The echo canceler adaptive filter typically employs a finite impulse response (FIR) filter having a set of weighting coefficients to model the acoustic coupling channel between the speaker and the microphone. During the downlink talking mode, the echo canceler adaptive filter attempts to model the acoustic coupling channel by dynamically adapting the weighting coefficients of the finite impulse response filter. Additionally, attenuators in the uplink path and in the downlink path may also be used to mitigate the effects of the echo signal in response to changes in the acoustic coupling channel.

When the near end user is not talking, then the echo canceler adaptive filter coefficient update procedure is typically idle since no downlink signal is present, however the filtering operation may still be active. When both the near end and far end are talking (i.e., double talk mode), the pre-echo canceler uplink microphone signal includes both interfering signals and the echo signal. Again the echo canceler adaptive filter coefficient update procedure is typically idle or significantly slower due to the interference of the noise end signal sources. The interfering signal includes near end speech, various noise components, and distortion. The various noise components may include elements such as non-linearities of the audio system, speaker distortion, and background noise. During double talk, the coefficient update procedure may be idle or altered, but the filtering operation will be active in an attempt to remove the echo component. One problem, however, is that real world effects including limitations in algorithm echo modeling convergence rates and steady state performance, variability in the echo path, mathematical precision limitations of a particular device employed, and non-linear audio system components, among others, all effect the ability of the adaptive echo canceller to remove or reduce the echo component from the transmit signal. As such, advanced modeling techniques, such as multiple cascaded adaptive filters have been explored to further improve the ability of an echo canceller system to minimize modeling errors and the corresponding residual echo.

Noise suppressors may be employed at both the near end and the far end to reduce the noise content of a transmitted voice signal. Noise suppression can be particularly useful when the wireless device is a mobile handset or hands-free telephone operating in the presence of background noise, such as when operating a vehicle. In vehicular environments, background noise may be generated as a result of driving at high speeds or on bumpy roads, operating a blower fan resulting in air turbulence over the microphone, lowering or raising a window resulting in wind rumble, operating windshield wipers, operating turn signals or performing other activities resulting in other sources of noise within the vehicle. While noise suppression techniques may reduce background noise in a static or slowly changing noise environment, both noise suppression and echo cancellation performance can be significantly degraded by the combined generation of noise and echo signals.

FIG. 1 illustrates a prior art cascade echo cancellation and noise suppression module 10 employing noise suppression logic 20, an echo canceler circuit 30, a digital-to-analog converter 40, a speaker 50, an analog-to-digital converter 60, and a microphone 70. The digital-to-analog converter 40 receives downlink data 52, and in response produces a downlink signal 54. The microphone 70 is coupled to the echo canceler circuit 30 via the analog-to-digital converter 60. The analog-to-digital converter 60 receives a pre-echo canceler uplink signal 62 and produces pre-echo canceler uplink data 64. Microphone 70 receives a portion of the downlink signal 54 produced by speaker 50 over an acoustic coupling channel 72 and in response produces the pre-echo canceler uplink signal 62.

Echo canceler circuit 30 includes a first echo canceler adaptive filter 80, first adder logic 82, a second echo canceler adaptive filter 84, and second adder logic 86. The first adder logic 82 receives the pre-echo canceler uplink data 64 and first echo estimation data 88 from the first echo canceler adaptive filter 80 and in response produces first post-echo canceler uplink data 90. The second adder logic 86 receives the first post-echo canceler uplink data 90 and second echo estimation data 92 from the second echo canceler adaptive filter 84 to produce second post-echo canceler uplink data 94. The noise suppression logic 20 receives final post-echo canceler uplink data 96 from the second echo canceler adaptive filter 84 and in response produces final uplink data 98.

Background noise is a persistent and common issue when echo cancellers are operating is harsh environments such as in an automobile environment. Due to the highly linear properties of the first echo canceler adaptive filter 80, background noise present in the pre-echo canceler uplink data 64 will be passed relatively unaffected as part of the first echo canceller uplink data 90 to the second echo canceler adaptive filter 84. However, due to the known suppression (non-linear) characteristics of the second stage cascaded adaptive filter 84, the background noise level or amplitude will be modulated roughly based on the far end voice signal receive activity and due to some subsequent degree of linear echo cancellation in the first echo canceler adaptive filter 80. Consequently, the noise suppression logic 20 receives, as part of the final post-echo canceler uplink data 96, the noise modulation of the background noise primarily due to the second echo canceler adaptive filter 84.

As known in the art, noise suppression algorithms typically employed such as Non-Linear Spectral Subtraction (NLSS) are most effective when the background noise power remains relatively constant or varies slowly (such as with the increase and decrease of vehicle velocity). The noise modulation effect introduced primarily due to the second echo canceler adaptive filter 84 can be quite rapid, and results in poor performance of the noise suppression module 20 such as reduced signal to noise ratio (SNR) as well as annoying noise artifacts introduced by the noise suppression module 20 itself. Therefore, while the multiple filter topology improves echo cancellation in the presence of noise, the far end user will receive the final uplink data 98 containing annoying background noise artifacts.

BRIEF DESCRIPTION OF THE DRAWINGS

The present invention is illustrated, by way of example and not limitation, in the accompanying figures, in which like reference numerals indicate similar elements, and in which.

DETAILED DESCRIPTION OF THE PREFERRED EMBODIMENTS

Figure 1:
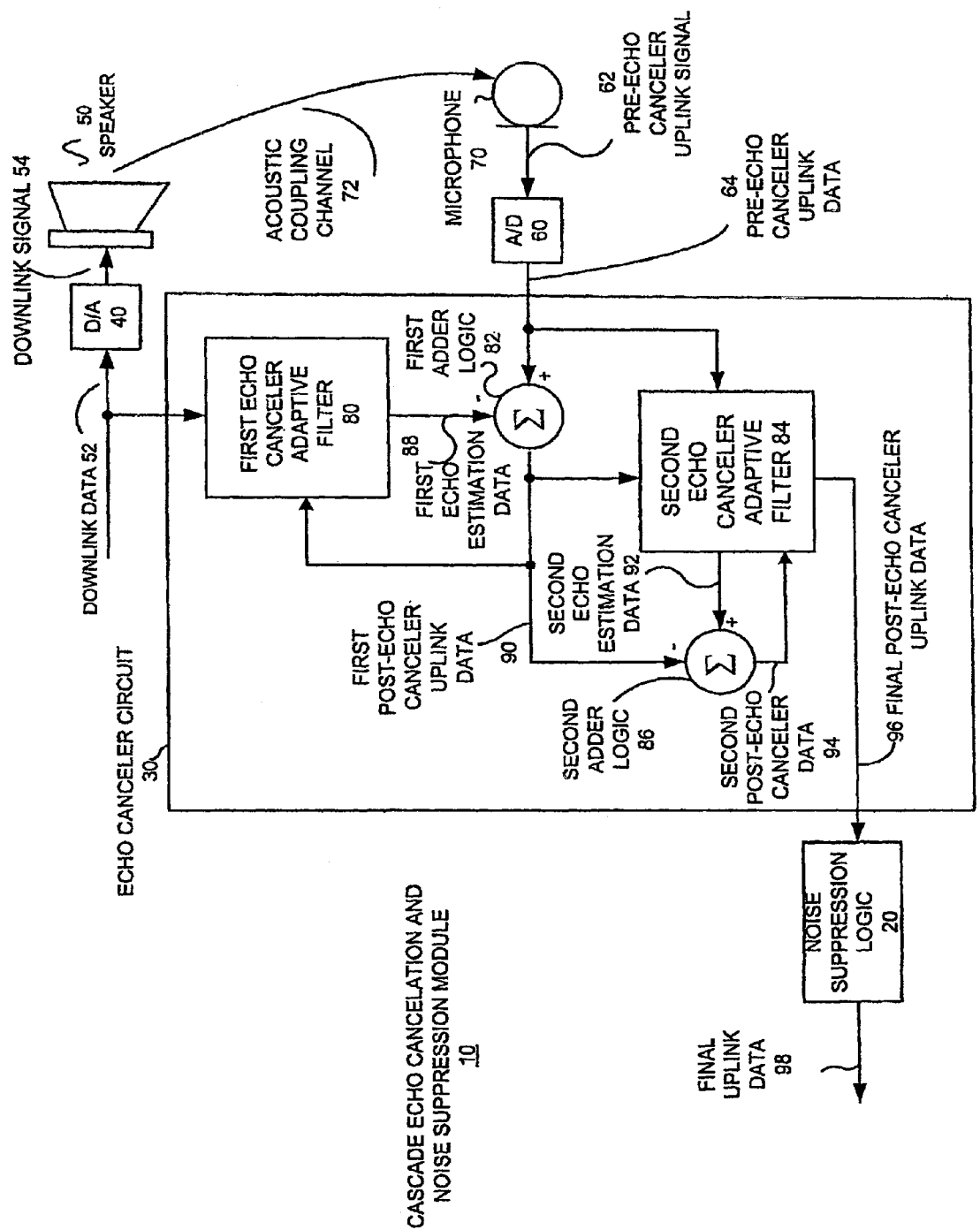
FIG. 1 is a block diagram of a prior art echo cancellation and noise suppression module.

An echo canceler circuit and method performs echo cancellation and noise suppression in a non-interfering manner. The echo canceler circuit includes pre-noise suppression logic, echo canceler coefficient logic, noise suppression logic and an echo canceler filter. The pre-noise suppression logic receives pre-echo canceler uplink data and downlink data, and in response produces pre-noise suppression uplink data. The echo canceler coefficient logic receives the pre-noise suppression uplink data and the pre-echo canceler uplink data, and in response produces filter coefficient data. The noise suppression logic receives the pre-noise suppression uplink data, and in response produces noise suppressed uplink data. The echo canceler filter receives the noise suppressed uplink data and the filter coefficient data and in response produces final uplink data. The invention described herein presents a unique cascaded echo canceller filter and noise suppression topology that allows for increased echo cancellation as well as a fully effective noise suppression module with compromising the performance of either.

Among other advantages, the present invention performs both cascaded echo cancellation and noise suppression in a non-interfering manner. The noise suppression logic does not interfere with the generation of the filter coefficient data because the echo canceler coefficient logic receives pre-noise suppression uplink data without having been first processed in the noise suppression logic. Accordingly, the echo canceler coefficient logic models the changing acoustic coupling channel and produces the filter coefficient data without any interference from the noise suppression logic. As a result, the echo canceler coefficient logic functions independently from the noise suppression logic.

Although the echo canceler filter receives the noise suppressed uplink data from the noise suppression logic, the generation of filter coefficient data is unaffected by the noise suppression logic. Therefore, the echo canceler filter may perform the adaptive echo cancellation function on the noise suppressed uplink data based on the independently generated filter coefficient data. As a result, the echo canceler filter produces final uplink data that has both been processed for echo cancellation and noise suppression, such that these functions are performed in a non-interfering manner. Since the noise suppression function is not introduced until after the modeling of the acoustic coupling channel and the generation of filter coefficient data, the generation of the filter coefficient data is independent of the noise suppressed uplink data. Additionally, the noise suppression logic does not encounter any artificial variations in a noise floor due to known suppression characteristics associated with cascaded echo cancellers. Consequently, the adaptation function of the filter coefficient data generator is able to achieve maximum echo cancellation performance since the noise suppression function does not affect the echo cancellation function and the maximum noise suppression performance available since the noise modulation caused by cascaded echo cancellation adaptive filtering and is eliminated.

Figure 2:
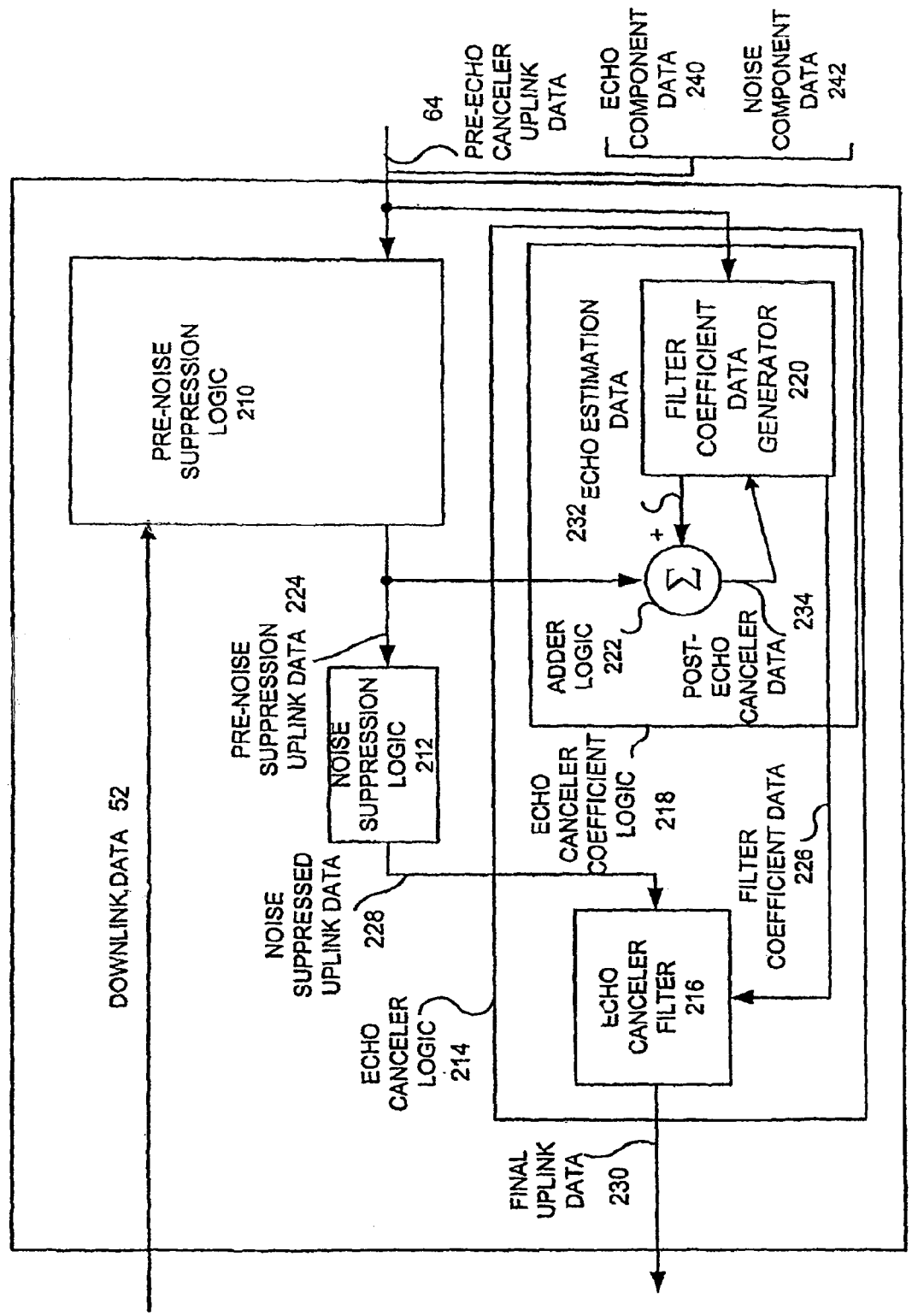
FIG. 2 is a block diagram illustrating one example of an echo canceler circuit according to one embodiment of the invention.

FIG. 2 is a block diagram of an echo canceler circuit 200 for performing both cascaded echo cancellation and noise suppression in a non-interfering manner. The echo canceler circuit 200 may be one or more suitably programmed processors, such as a microprocessor and a microcontroller, or a digital signal processor, and therefore includes associated memory, which contains executable instructions that when executed cause the echo canceler circuit 200 to carry out the operations described herein. In addition, the echo canceler circuit 200, as used herein, may include discrete logic, state machines or any other suitable combination of hardware, software, middleware, and/or firmware. The echo canceler circuit 200 may also be employed in an analog or digital modem in a telecommunications system.

The echo canceler circuit 200 includes pre-noise suppression logic 210, noise suppression logic 212, and echo canceler logic 214. As discussed later, the pre-noise suppression logic 210 effectively performs at least some of the functions of the first stage of the overall cascaded echo canceller. The echo canceler logic 214 effectively performs at least some of the functions of the second stage of the overall cascaded echo canceller and includes an echo canceler filter 216, and echo canceler coefficient logic 218. The echo canceler coefficient logic 218 includes a filter coefficient data generator 220 and adder logic 222.

The pre-noise suppression logic 210 receives the pre-echo canceler uplink data 64 and the downlink data 52, and in response produces pre-noise suppression uplink data 224. The echo canceler coefficient logic 218 receives the pre-noise suppression uplink data 224 and the pre-echo canceller uplink data 64 and in response produces filter coefficient data 226. The noise suppression logic 212 receives the pre-noise suppression uplink data 224, and in response produces noise suppressed uplink data 228. The echo canceler filter 216 receives the noise suppressed uplink data 228 and the filter coefficient data 226, and in response produces final uplink data 230.

The filter coefficient data generator 220 receives the pre-echo canceler uplink data 64 and post echo canceler data 234 and in response produces echo estimation data 232 and the filter coefficient data 226. The adder logic 222 receives the pre-noise suppression uplink data 224 and the echo estimation data 232 and in response provides the post-echo canceler data 234 to the filter coefficient data generator 220.

Figure 3:
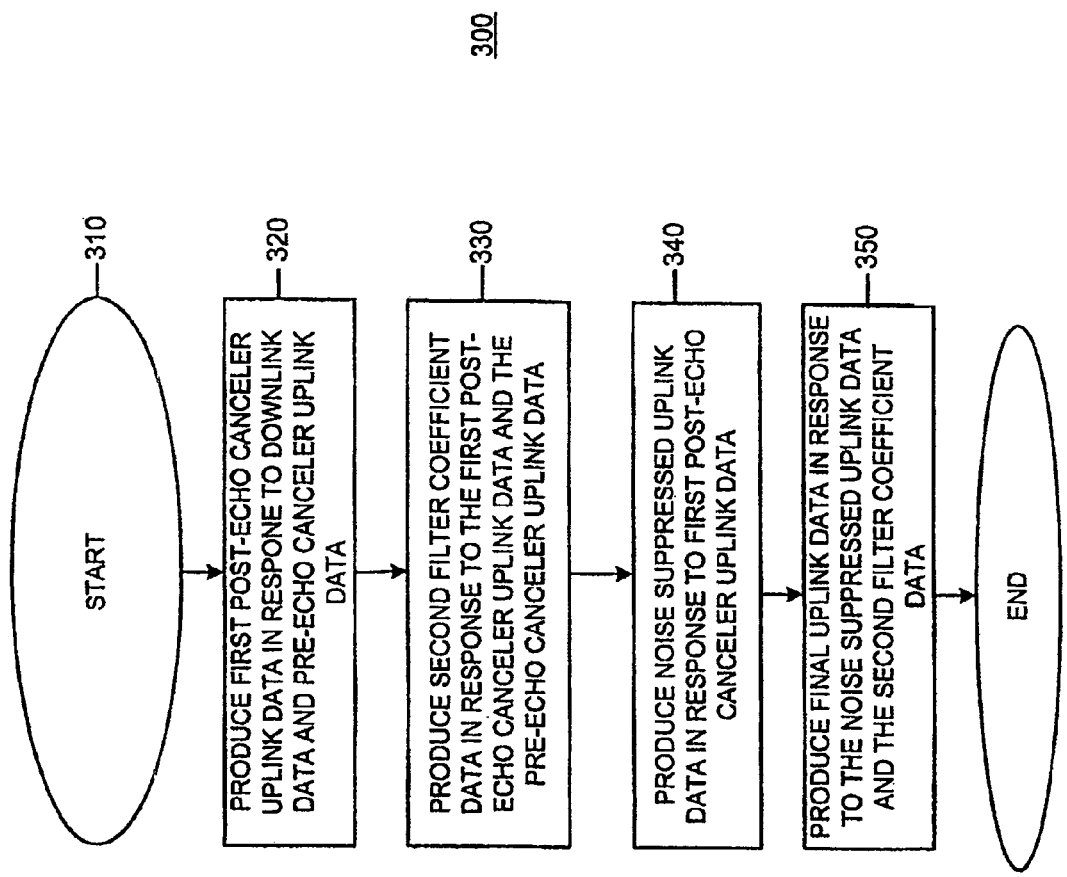
FIG. 3 is a flowchart illustrating one example of a method for echo cancellation and noise suppression according to one embodiment of the invention.

FIG. 3 illustrates a method 300 for performing echo cancellation and noise suppression according to one embodiment of the invention. The method 300 may be carried out by the echo canceler circuit 200 of FIG. 2. However, any other suitable structure may also be used. It will be recognized that the method 300 beginning with Step 310 will be described as a series of operations, but the operations may be performed in any suitable order and may be repeated in any suitable combination. As shown in Step 320, the pre-noise suppression logic 210 produces the pre-noise suppression uplink data 224 in response to the downlink data 52 and the pre-echo canceler uplink data 64.

As shown in Step 330, the echo canceler coefficient logic 218 produces the filter coefficient data 226 in response to the pre-noise suppression uplink data 224 and the pre-echo canceler uplink data 64. As previously described, the echo canceler coefficient logic 218 produces the filter coefficient data 226 by adapting to changes in the pre-echo canceler uplink data 64 and pre-noise suppression uplink data.

As shown in Step 340, the noise suppression logic 212 produces the noise suppressed uplink data 228 in response to the pre-noise suppression uplink data 224. Since the pre-noise suppression uplink data 224 is not processed by the echo canceler logic 214, the pre-noise suppression uplink data 224 is not affected by the adapting function of echo canceler logic 214.

As shown in Step 350, the echo canceler filter 216 produces the final uplink data 230 in response to the noise suppressed uplink data 228 and the filter coefficient data 226. Since the echo canceler filter 216 receives the noise suppressed uplink data 228 from the noise suppression logic 212, the echo canceler filter 216 may perform the adaptive filter function on the noise suppressed uplink data 228 by applying the filter coefficient data 226 previously produced.

According one example, the pre-echo canceller uplink data 64 includes echo component data 240 and noise component data 242, such that the echo canceler filter 216 produces the final uplink data with reduced echo component data 240. As previously stated, the noise suppression logic 212 produces the noise suppressed uplink data 228 with reduced noise component data 242 without being affected by the generation of the filter coefficient data 226 produced by the echo canceler coefficient logic 218. Accordingly, the noise suppression logic 212 produces the noise suppressed uplink data 228 with reduced noise component data 242 without being affected by the generation of the final uplink data 230 produced by the echo canceler filter 216.

Figure 4:
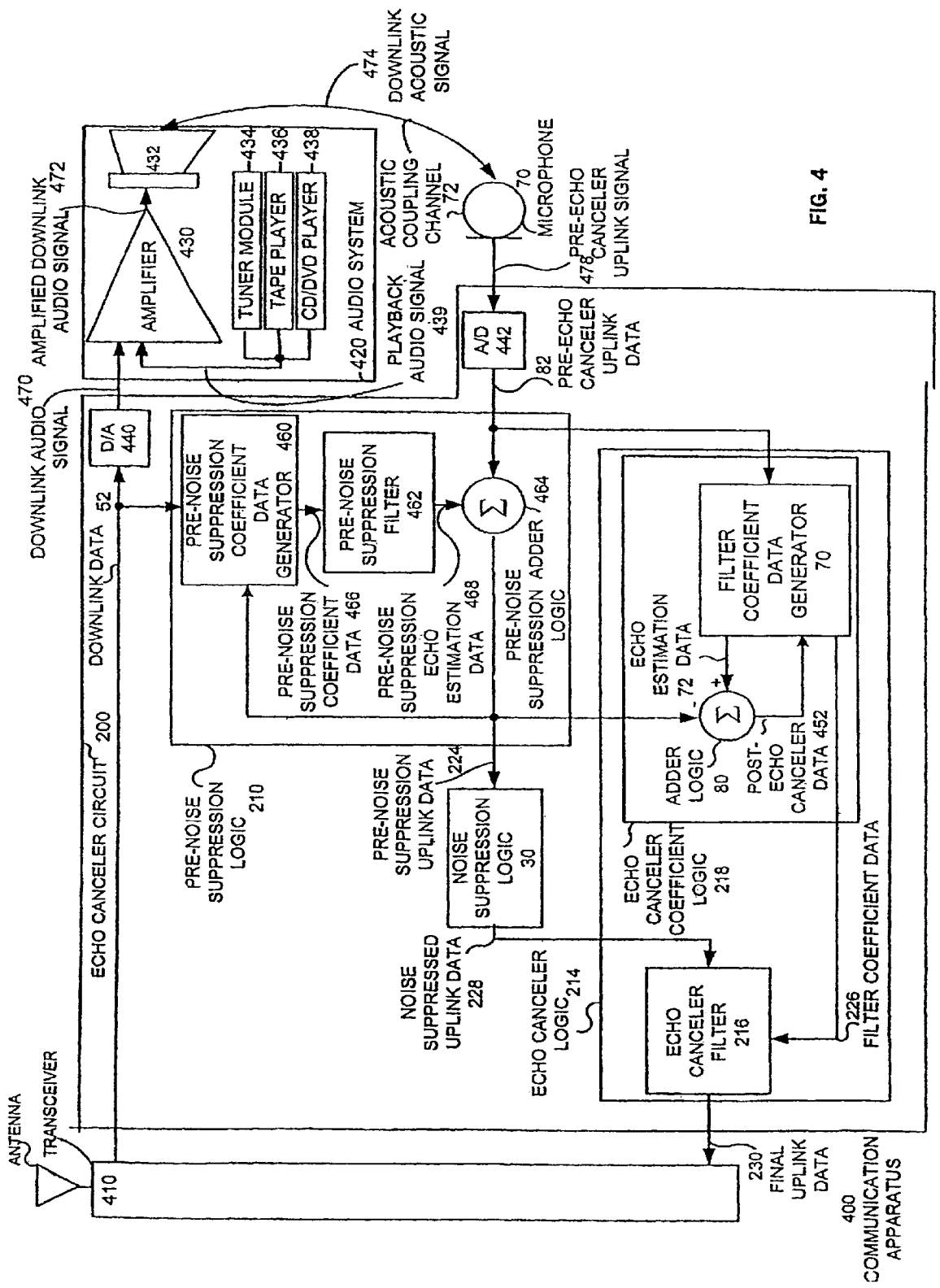
FIG. 4 is a block diagram illustrating another example of an echo canceler circuit according to one embodiment of the invention.

FIG. 4 is a block diagram of a communication apparatus 400 in accordance with one embodiment of the invention. The communication apparatus 400 includes the echo canceler circuit 200, a transceiver 410, an audio system 420, and the microphone 70. The audio system 420 includes an amplifier 430, at least one speaker 432, a tuner module 434, a tape player 436 and a CD/DVD player 438. According to one embodiment, the echo canceller circuit 200 further includes a digital-to-analog converter 440, and an analog-to-digital converter 442.

The pre-noise suppression logic 210 includes a pre-noise suppression coefficient data generator 460, a pre-noise suppression filter 462, and pre-noise suppression adder logic 464, which when combined effectively perform the first stage of the cascaded adaptive filter. The pre-noise suppression coefficient data generator 460 receives the downlink data 52, and in response produces pre-noise suppression coefficient data 466. The pre-noise suppression filter 462 receives the pre-noise suppression coefficient data 466 and in response produces the pre-noise suppression echo estimation data 468. The pre-noise suppression adder logic 464 receives the pre-noise suppression echo estimation data 468 and the pre-echo canceler uplink data 82 and in response produces the pre-noise suppression uplink data 224.

The digital-to-analog converter 440 receives the downlink data 52, and in response produces a downlink audio signal 470. The amplifier 430 receives the downlink audio signal 470 and in response produces an amplified downlink audio signal 472. The at least one speaker 432 receives the amplified downlink audio signal 472 and in response produces a downlink acoustic signal 474. The microphone 70 receives at least a portion of the downlink acoustic signal 474 produced as a result of the at least one speaker 432 acoustically producing the amplified downlink audio signal 472, and in response produces a pre-echo canceler uplink signal 478. The analog-to-digital converter 442 receives the pre-echo canceler uplink signal 478 and in response produces the pre-echo canceler uplink data 82. The transceiver 410 receives the final uplink data 230 from the echo canceler filter 216 and also provides the downlink data 52 to the pre-noise suppression coefficient data generator 460 and the digital-to-analog converter 440.

Figure 5:
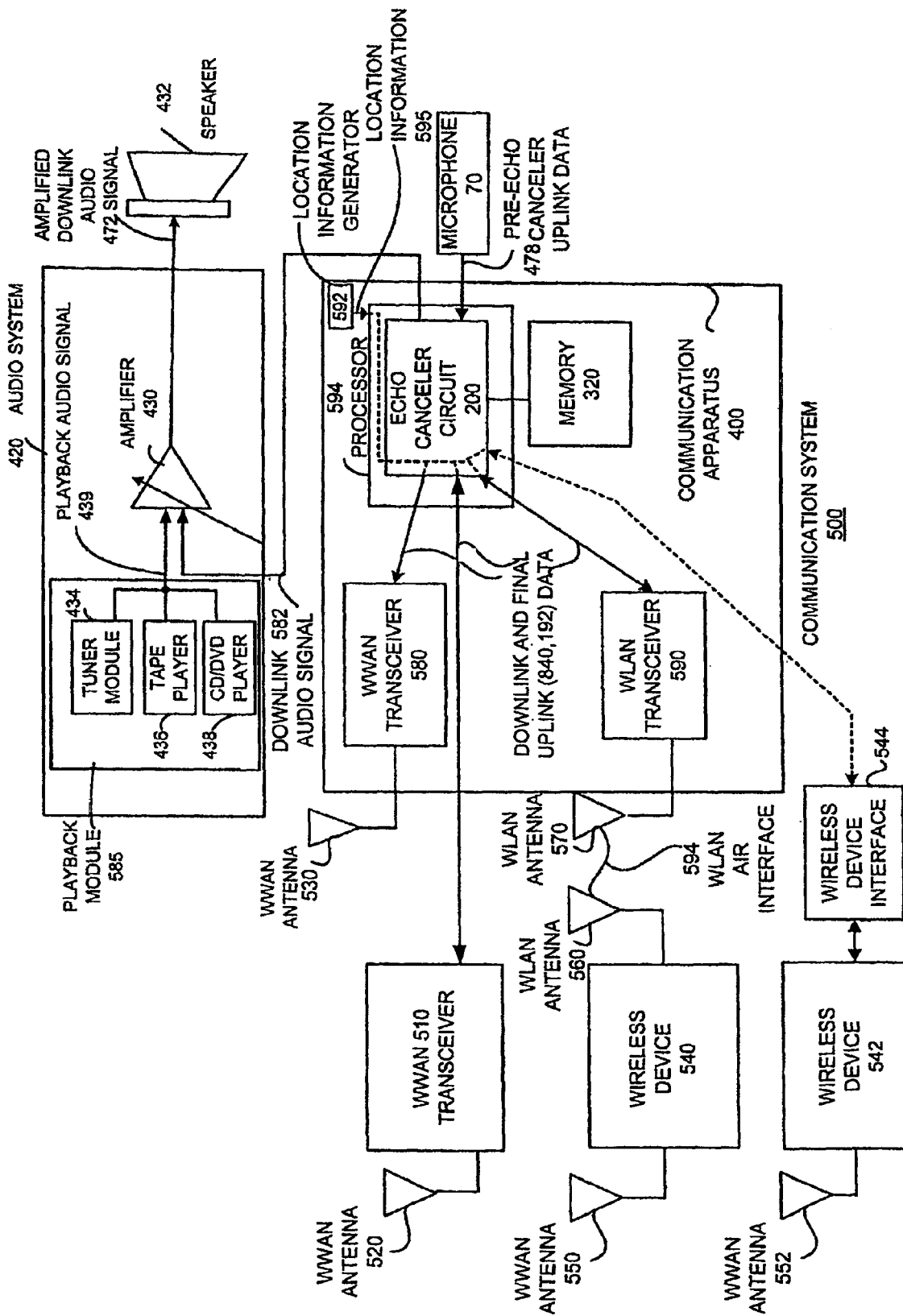
FIG. 5 is a block diagram illustrating an example of a communication system according to one exemplary embodiment of the invention.

FIG. 5 is a block diagram of a communication system 500 according to one exemplary embodiment of the invention. The communications system 500 includes the communication apparatus 400, the audio system 420, the at least one speaker 432, the microphone 70, a wireless wide area network (WWAN) transceiver 510, WWAN antennas 520, 530, 550, 552, wireless devices 540, 542, and wireless local area network (WLAN) antennas 560, 570.

The communication apparatus 400 includes the processor 594, the memory 320, a WWAN transceiver 580, a WLAN transceiver 590, and a location information generator module 592, such as a global positioning system (GPS) receiver. The processor 594 receives location information 595 from the location information generator 592 and in response relays the location information 595 to the WWAN transceiver 510, 580 or to the wireless device 540, 542.

According to one alternative embodiment, the echo canceler circuit 200 is coupled to either one or any combination of the WWAN transceiver 580, the WWAN transceiver 510 or the WLAN transceiver 590. For example, the WWAN transceiver 580, 510 may represent any one of a number of wireless devices, such as, for example, a portable cellular phone, an in-vehicle mobile phone, a wireless personal digital system (PDA), a wireless fidelity device (WiFi, i.e., a device based on the IEEE 802.11 specification) or any suitable communication device. According to another embodiment, the WWAN transceiver 510 may be external to the communication apparatus 400 and, therefore, the echo canceler circuit 200 may be coupled to the WWAN transceiver 510 via an appropriate link, such as a wired cable.

According to one embodiment, the WLAN transceiver 590 may be integrated into the communication apparatus 400. The WLAN transceiver 590 may be a Bluetooth compliance device or a wireless fidelity device (WiFi, i.e., a device based on the IEEE 802.11 specification, or any suitable communication device).

The WLAN transceiver 590 may interface with the wireless device 540 via a WLAN interface 594, the WLAN 560 antenna, and the WLAN antenna 570. The wireless device 540, 542 may be a cellular phone, a personal digital assistant equipped with a wireless interface, a portable computer also equipped with a WWAN and WLAN interface or any suitable wireless device. The wireless device 540, 542 may communicate with a WWAN, such as a cellular telephone system suitable for communicating with a public switching telephone network (PSTN). Accordingly, the wireless device 540, 542 may communicate with the cellular telephone system using any wireless communication protocol, such as, for example, code division multiple access (CDMA), time division multiple access (TDMA), advance mobile phone standard (AMPS), group special mobile (GSM), or any other suitable wireless communication protocols available now or in the future.

The communication apparatus 400 according to one embodiment includes a housing containing the processor 594, the wireless wide area transceiver 580, the WLAN transceiver 590 and the location information generator 592. Additional or fewer components may be included in the communication apparatus 400 other than those described above. As is known in the art, the processor 594, the WWAN transceiver 580, the WLAN transceiver 590 and the location information generator 592 may each be manufactured as separate circuit boards or integrated circuit chips from one or more manufacturers. The circuit boards may be interconnected as required through the use of a mother board, a flat or non-flat flexible multi-conductor cable, a multi-conductor wired cable or any suitable type of interconnection device. Each circuit board may be attached or coupled either directly or indirectly to the housing or to other circuit boards via a suitable fastening device as is known in the art, such as a connector, a clamp, a clip, a screw, a nut and a bolt. The integrated circuit chips may be interconnected as required via a circuit board, a multi-circuit chip carrier, a flat flexible multiconductor cable, a multiconductor wired cable or any suitable type of interconnection device. The circuit boards and integrated circuit chips may be mounted using chemical bonding such as an adhesive or any suitable fastening device.

According to one embodiment, the communication apparatus 400 housing may include: a circuit board comprising the processor 594 and memory 320, a circuit board comprising the WWAN transceiver 580, and a circuit board comprising the WLAN transceiver 590. The circuit boards may be interconnected and attached or coupled to the housing either directly or indirectly as previously discussed. Additionally, the communication apparatus 400 housing may include connectors for coupling to external components such as the audio system 420, the microphone, 70, WWAN antenna 530, WLAN antenna 570, WWAN transceiver 510 or any other suitable device. For example, the communication apparatus 400 may interface with other suitable components not described herein. The connectors may be any suitable device for interconnecting the communication apparatus 400 to any external components such as via a wired cable, a fiber optic link, or a radio frequency interface.

According to one embodiment, the communication apparatus 400 is a telematics communication module supporting the collection and dissemination of data, including audio speech. For example, the telematics communication module may be based on General Motors' OnStar System, which automatically calls for emergency assistance if the vehicle is in an accident. According to another embodiment, the communication apparatus 400 also can perform such functions as remote engine diagnostics, tracking stolen vehicles and providing roadside assistance, as well as other functions.

Figure 6:
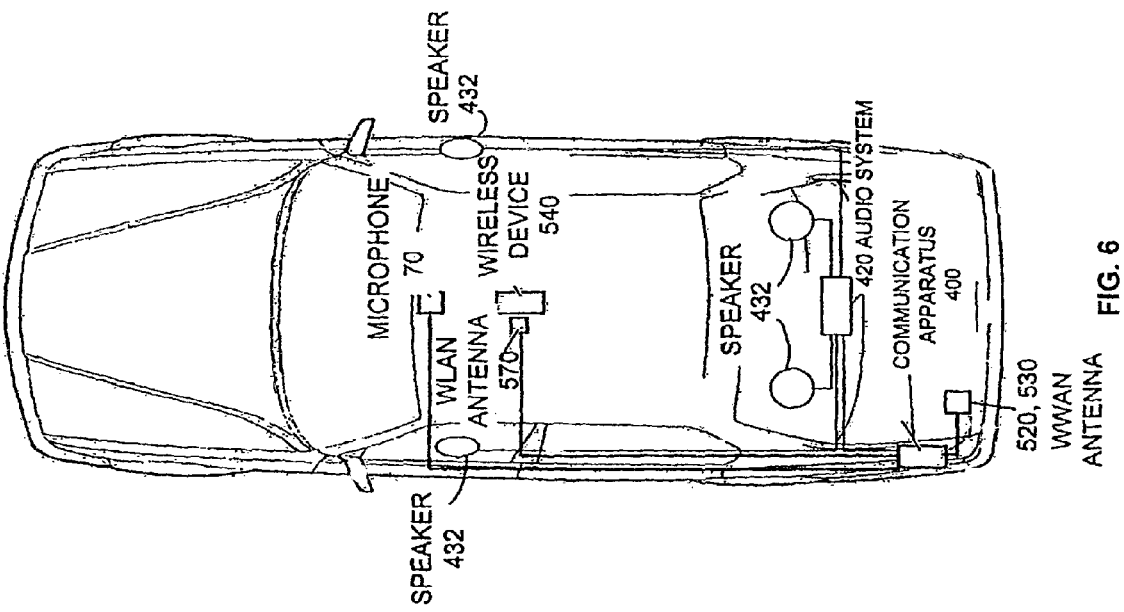
FIG. 6 is a block diagram of an in-vehicle communication system according to one exemplary embodiment of the invention.

FIG. 6 is a block diagram of an in-vehicle communication system 600 according to at least one embodiment of the invention. The in-vehicle communication system 600 includes the communication apparatus 400 coupled to the wireless device 540 via the wireless local area network antenna 570. For example, the communication interface between the wireless device 540 and the communication apparatus 400 may be a Bluetooth interface, as previously discussed. However, the in-vehicle communication system 600 may include a wireless wide area network transceiver 580, as shown previously with respect to FIG. 5. Alternatively, the communication apparatus 400 may interface with the WWAN transceiver 510, 580 either external or internal to the communication apparatus 400 and coupled to WWAN antenna 520, 530 and may be mounted in any suitable location.

The communication apparatus 400 is also shown to interface with the vehicle's audio system 420. Although the audio system 420 and the communication apparatus 400 are shown in the trunk area of the vehicle, the communication apparatus 400 and the audio system 420 may be located in any suitable location, including in the dashboard or under the dashboard. According to one embodiment, the audio system 420 may include the communication apparatus 400 and any necessary transceiver, such as the wireless wide area network transceiver 510, 580 and the wireless local area network transceiver 590.

Among other advantages, the present invention performs both cascaded echo cancellation and noise suppression in a non-interfering manner. The noise suppression logic 212 does not interfere with the generation of the filter coefficient data 226 because the echo canceler coefficient logic 218 receives pre-noise suppression uplink data 224 without having been first processed in the noise suppression logic 212. Accordingly, the echo canceler coefficient logic 218 produces the filter coefficient data 226 without any interference from the noise suppression logic 212. As a result, the echo canceler coefficient logic 218 functions independently from the noise suppression logic 212.

Although the echo canceler filter 216 receives the noise suppressed uplink data 228 from the noise suppression logic 212, the generation of filter coefficient data 226 is unaffected by the noise suppression logic 212. Therefore, the echo canceler filter 216 may perform the adaptive echo cancellation function on the noise suppressed uplink data 228 based on the independently generated filter coefficient data 226. As a result, the echo canceler filter 216 produces final uplink data 230 that has both been processed for echo cancellation and noise suppression, such that these functions are performed in a non-interfering manner. Since the noise suppression function is not introduced until after the modeling of the acoustic coupling channel 72 and the generation of filter coefficient data 226, the generation of the filter coefficient data 226 is independent of the generation of the noise suppressed uplink data. As a result, the noise suppression logic 212 does not encounter or at least encounters reduced artificial variations in a noise floor due to know suppression characteristics of cascaded echo cancellers. Consequently, the adaptation function of the filter coefficient data generator 220 is able to achieve both maximum echo cancellation performance and maximum noise suppression performance available since the noise suppression function has a minimal effect the echo cancellation function.

It is understood that the implementation of other variations and modifications of the present invention and its various aspects will be apparent to those of ordinary skill in the art and that the present invention is not limited by the specific embodiments described. It is therefore contemplated to cover by the present invention any modifications, variations or equivalents that fall within the spirit and scope of the basic underlying principles disclosed and claimed herein.

What is claimed is:

1. A method for suppressing echoes and noise in data, the method comprising:
   filtering received data to produce pre-noise suppression data;
   removing noise from the pre-noise suppression data to provide noise-suppressed data;
   dynamically determining at least one weighted filter coefficient using at least the pre-noise suppression data and not the noise suppressed data, the determining occurring independently from and not being affected by removing the noise from the pre-noise suppression data;
   wherein removing the noise from the pre-noise suppression data occurs independently from and is not affected by dynamically determining the at least one weighted coefficient.

2. The method of claim 1 further comprising filtering echoes from the noise suppressed data using the at least one weighted filter coefficient to produce final data, the final data being substantially free of noise and substantially free of echoes.

3. The method of claim 2 further comprising providing the final data to a transceiver for transmission.

4. The method of claim 1 wherein the received data is received from a microphone.

5. The method of claim 1 further comprising performing a telemetric function, the telemetric function selected from the group consisting of performing a remote engine diagnostic function; tracking a vehicle location; and providing roadside assistance.

6. The method of claim 1 wherein the steps are performed at a portable wireless device.

7. An apparatus comprising:
   pre-noise suppression logic, the pre-noise suppression logic being configured to receive data and to responsively filter the received data to produce pre-noise suppression data;
   noise suppression logic coupled to the pre-noise suppression logic, the noise suppression logic being configured to remove noise from the pre-noise suppression data and to responsively provide noise-suppressed data;
   a coefficient generator coupled to the pre-noise suppression logic, the coefficient generator being configured to dynamically determine at least one weighted filter coefficient using at least in part the pre-noise suppression data and not the noise suppressed data, the determination occurring independently from and not being affected by the removal of the noise from the pre-noise suppression data at the noise suppression logic, and
   wherein removing the noise at the noise suppression logic occurs independently from and is not affected by the dynamic determination of the at least one weighted coefficient at the coefficient generator.

8. The apparatus of claim 7 further comprising an echo canceller filter coupled to the noise suppression logic and the coefficient generator, the echo canceller filter configured to filter echoes from the noise suppressed data using the at least one weighted filter coefficient to produce final data, the final data being substantially free of noise and substantially free of echoes.

9. The apparatus of claim 7 wherein the echo canceller filter is configured to provide the final data to a transceiver for transmission.

10. The apparatus of claim 7 wherein the received data is received from a microphone.

11. The apparatus of claim 7 wherein the apparatus comprises a portable wireless device.

12. An echo canceller apparatus comprising:
    a Blue tooth-compliant transceiver;
    pre-noise suppression logic, the pre-noise suppression logic being coupled to the Blue tooth-compliant transceiver and configured to receive data from the transceiver and to responsively filter the received data to produce pre-noise suppression data;
    noise suppression logic coupled to the pre-noise suppression logic, the noise suppression logic being configured to remove noise from the pre-noise suppression data and to responsively provide noise-suppressed data;
    a coefficient generator coupled to the pre-noise suppression logic, the coefficient generator being configured to dynamically determine at least one weighted filter coefficient using at least in part the pre-noise suppression data and not the noise suppressed data, the determination occurring independently from and not being affected by the removal of the noise from the pre-noise suppression data at the noise suppression logic;
    wherein removing the noise at the noise suppression logic occurs independently from and is not affected by the dynamic determination of the at least one weighted coefficient at the coefficient generator;
    an echo canceller filter coupled to the Blue tooth-compliant transceiver, the noise suppression logic, and the coefficient generator, the echo canceller filter being configured to filter echoes from the noise suppressed data using the at least one weighted filter coefficient to produce final data, the final data being substantially free of noise and substantially free of echoes;

wherein the Blue tooth-compliant transceiver is configured to receive the final data and wirelessly transmit the final data in a Blue Tooth compliant form.

13. The echo canceller apparatus of claim 12 wherein the received data is received from a microphone.

14. The echo canceller apparatus of claim 12 further comprising telemetric logic, the telemetric logic configured to perform a telemetric function, the telemetric function selected from the group consisting of performing a remote engine diagnostic function; tracking a vehicle location; and providing roadside assistance.

15. The echo canceller apparatus of claim 12 wherein an audio system is coupled thereto, the audio system being configured to present the final data obtained from the echo canceller apparatus to a user.

16. A computer usable medium having a computer readable program code embodied therein, said computer readable program code adapted to be executed to implement a method of suppressing echoes and noise in data, the method comprising:
    filtering received data to produce pre-noise suppression data;
    removing noise from the pre-noise suppression data to provide noise-suppressed data;
    dynamically determining at least one weighted filter coefficient using at least the pre-noise suppression data and not the noise suppressed data, the determining occurring independently from and not being affected by removing the noise from the pre-noise suppression data;
    wherein removing the noise from the pre-noise suppression data occurs independently from and is not affected by dynamically determining the at least one weighted coefficient.

17. The computer usable medium of claim 16 wherein the method further comprises filtering echoes from the noise suppressed data using the at least one weighted filter coefficient to produce final data, the final data being substantially free of noise and substantially free of echoes 18. The computer usable medium of claim 16 wherein the received data is received from a microphone.

19. The computer usable medium of claim 16 wherein the method further comprises performing a telemetric function, the telemetric function selected from the group consisting of performing a remote engine diagnostic function; tracking a vehicle location; and providing roadside assistance.

20. A vehicle comprising:
    a vehicle body;
    a passenger compartment disposed at least partially within the vehicle body;
    a transceiver;
    an echo canceller apparatus coupled to the transceiver, the echo canceller apparatus comprising:
        pre-noise suppression logic, the pre-noise suppression logic being configured to receive data from the transceiver and to responsively filter the received data to produce pre-noise suppression data;
        noise suppression logic coupled to the pre-noise suppression logic, the noise suppression logic being configured to remove noise from the pre-noise suppression data and to responsively provide noise-suppressed data;
        a coefficient generator coupled to the pre-noise suppression logic, the coefficient generator being configured to dynamically determine at least one weighted filter coefficient using at least in part the pre-noise suppression data and not the noise suppressed data, the determination occurring independently from and not being affected by the removal of the noise from the pre-noise suppression data at the noise suppression logic, and
        wherein removing the noise at the noise suppression logic occurs independently from and is not affected by the dynamic determination of the at least one weighted coefficient at the coefficient generator;
        an echo canceller filter coupled to the transceiver, the noise suppression logic, and the coefficient generator, the echo canceller filter being configured to filter echoes from the noise suppressed data using the at least one weighted filter coefficient to produce final data, the final data being substantially free of noise and substantially free of echoes;
    an audio system disposed at least partially within the passenger compartment and coupled to the echo canceller apparatus, the audio system being configured to present at least some of the final data obtained from the echo canceller apparatus to a user of the vehicle;
    a vehicle power source, the vehicle power source coupled to at least the echo canceller apparatus and the audio system, the vehicle power source being configured to supply power to at least the echo canceller apparatus and the audio system.

21. The vehicle of claim 20 wherein the transceiver is configured to operate according to a Blue tooth-compliant protocol.

22. The vehicle of claim 20 further comprising a microphone and wherein the echo canceller apparatus receives data from the microphone.

23. The vehicle of claim 20 further comprising telemetric logic, the telemetric logic configured to perform a telemetric function, the telemetric function selected from the group consisting of performing a remote engine diagnostic function; tracking a vehicle location; and providing roadside assistance.

24. The vehicle of claim 20 wherein the transceiver is configured to receive at least some of the final data and wirelessly transmit at least some of the final data.

25. The vehicle of claim 24 wherein the transceiver transmits the data in Blue tooth-compliant form.

* * * * *